United States Patent [19]
Blair et al.

[11] Patent Number: 5,457,965
[45] Date of Patent: Oct. 17, 1995

[54] LOW REFRIGERANT CHARGE DETECTION SYSTEM

[75] Inventors: John H. Blair, Westland; Norman H. Dolinski, Grosse Pointe Woods; Gerhard A. Dage, Franklin; George E. Peck, Dearborn; Manfred Koberstein, Warren; Robert W. Matteson, Ann Arbor, all of Mich.

[73] Assignee: Ford Motor Company, Dearborn, Mich.

[21] Appl. No.: 226,218

[22] Filed: Apr. 11, 1994

[51] Int. Cl.⁶ ................................................... F25B 49/02
[52] U.S. Cl. ........................... 62/129; 62/209; 62/228.3
[58] Field of Search ........................... 62/126, 129, 158, 62/228.3, 208, 209, 127, 225

[56] References Cited

U.S. PATENT DOCUMENTS

| | | | |
|---|---|---|---|
| 3,633,380 | 1/1972 | Pellizzetti | 62/217 |
| 3,686,892 | 8/1972 | Bassett, Jr. | 62/158 |
| 3,702,064 | 11/1972 | Ciolli | 62/158 |
| 3,803,865 | 4/1974 | Newton | 62/225 X |
| 3,913,347 | 10/1975 | Stevens | 62/209 |
| 4,114,448 | 9/1978 | Merritt | 73/362 AR |
| 4,236,621 | 12/1980 | Mukai et al. | 192/82 |
| 4,265,091 | 5/1981 | Kobayashi | 62/126 |
| 4,325,222 | 4/1982 | Nakamura et al. | 62/126 |
| 4,459,819 | 7/1984 | Hargraves | 62/225 X |
| 4,463,573 | 8/1984 | Zeno et al. | 62/157 |
| 4,545,212 | 10/1985 | Noda | 62/129 |
| 4,563,878 | 1/1986 | Baglione | 62/158 X |
| 4,616,485 | 10/1986 | Gillett et al. | 62/228.1 |
| 4,633,675 | 1/1987 | Sato | 62/208 |
| 4,651,535 | 3/1987 | Alsenz | 62/126 X |
| 4,677,830 | 7/1987 | Sumikawa et al. | 62/126 |
| 4,689,968 | 9/1987 | McCulloch et al. | 62/225 |
| 4,745,765 | 5/1988 | Pettitt | 62/129 |
| 4,753,083 | 6/1988 | Sato | 62/209 |
| 4,835,976 | 6/1989 | Torrence | 62/115 |
| 4,841,734 | 6/1989 | Torrence | 62/115 |
| 5,009,074 | 4/1991 | Goubeaux et al. | 62/115 |
| 5,119,638 | 6/1992 | Cummings et al. | 62/126 |
| 5,144,814 | 9/1992 | Gandette | 62/225 |
| 5,251,453 | 10/1993 | Stanke et al. | 62/126 |

*Primary Examiner*—Harry B. Tanner
*Attorney, Agent, or Firm*—Raymond L. Coppiellie; Roger L. May

[57] ABSTRACT

An apparatus for detecting is disclosed for detecting a low level of refrigerant circulating through a motor vehicle refrigerant circuit. The apparatus comprises an electronic logic module, and a pressure transducer and a thermistor preferably located in the refrigerant circuit between the compressor and the evaporator. The pressure transducer generates a signal indicative of the refrigerant pressure, from which the module derives a saturation temperature of the refrigerant. The saturation temperature is compared with the measured temperature to determine if a superheat condition exists indicative of low refrigerant charge exists. When the refrigerant remains at a predetermined level of superheating, the compressor clutch is disengaged to interrupt circulation through the refrigerant circuit. In an alternative embodiment, a pair of thermistors are respectively situated proximate an inlet and an outlet of an evaporator, and the module interrupts circulation when the outlet thermistor indicates a temperature more than a predetermined amount greater than the inlet thermistor. In a third embodiment, a pressure switch in the refrigerant circuit generates a signal when a predetermined pressure is reached, and the module interrupts circulation if the temperature of the medium at the predetermined pressure corresponds to a superheat condition.

11 Claims, 2 Drawing Sheets

LOW REFRIGERANT CHARGE DETECTION SYSTEM

TECHNICAL FIELD

This invention relates to air conditioning stems for motor vehicles and, more particularly, to such a system having a low refrigerant charge detection apparatus.

BACKGROUND ART

Air conditioning systems for motor vehicles typically include a compressor, a condenser, an evaporator, and an accumulator arranged as a refrigerant circuit. Proper lubrication of the compressor is usually dependent on oil circulating with the refrigerant through the system, and therefore the compressor is susceptible to damage if the mass flow rate of the refrigerant diminishes past a certain critical level. This can occur, for example, when refrigerant volume is lost through leakage or otherwise. It is therefore desirable to detect the approach of such a condition and alert the operator of the vehicle so that some action can be taken before the compressor is damaged. In the event that no preventative maintenance is performed, it is desirable to shut down the compressor automatically.

Various low refrigerant charge detecting devices have been proposed. U.S. Pat. No. 4,545,212 to Noda, for example, discloses a superheat detector including a semiconductor pressure sensor and a semiconductor temperature sensor. An operational controller converts an output signal from the semiconductor pressure sensor to a value corresponding to a saturation temperature of the refrigerant, and produces an output electrical signal corresponding to superheat condition of the refrigerant by comparison between the saturation temperature and the output from the semiconductor temperature sensor. Similarly, U.S. Pat. No. 4,677,830 to Sumikawa et al. discloses a system wherein the temperature and pressure of refrigerant at the outlet of the evaporator are detected, respectively, by a temperature sensor and a pressure sensor, and the flow rate of refrigerant within the refrigerating cycle is controlled by controlling the opening of an expansion valve. The pressure of refrigerant detected by the pressure sensor is converted into a corresponding saturation temperature, and determining means determines whether the refrigerant quantity is insufficient by comparing the difference between the refrigerant temperature and the corresponding saturation temperature of the refrigerant with a predetermined reference value. When the refrigerant quantity is determined to be insufficient, a valve control means causes disengagement of the electromagnetic clutch of the compressor.

SUMMARY OF THE INVENTION

The present invention is an apparatus for detecting a low level of a refrigerant circulating through a motor vehicle refrigerant circuit. The apparatus comprises a pressure transducer for generating a signal indicative of the pressure of the refrigerant in the refrigerant circuit, means for measuring the temperature of the refrigerant, and an electronic logic module. The module accepts a plurality of inputs from the pressure transducer and the means for measuring the temperature and interrupts operation of the compressor when the refrigerant remains at a predetermined level of superheating.

In a second embodiment, the apparatus comprises a first thermistor situated in the refrigerant circuit proximate an inlet of an evaporator, and a second thermistor situated in the refrigerant circuit proximate an outlet of the evaporator. The electronic logic module is in electrical communication with the thermistors, and is adapted to interrupt circulation through the refrigerant circuit when the second thermistor indicates a temperature more than a predetermined amount greater than the first thermistor.

In a third embodiment, the apparatus comprises a switch situated in the refrigerant circuit and generating an output signal when a predetermined pressure is reached, and means for measuring the temperature of the medium. The electronic logic module is in electrical communication with the switch and the means for measuring the temperature of the medium, and is adapted to interrupt circulation through the refrigerant circuit if the temperature of the medium at the predetermined pressure corresponds to a superheat condition.

Accordingly, it is an object of the present invention to provide an apparatus of the type described above which is more reliable and simpler than conventional mechanical systems for detecting low refrigerant charge levels.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
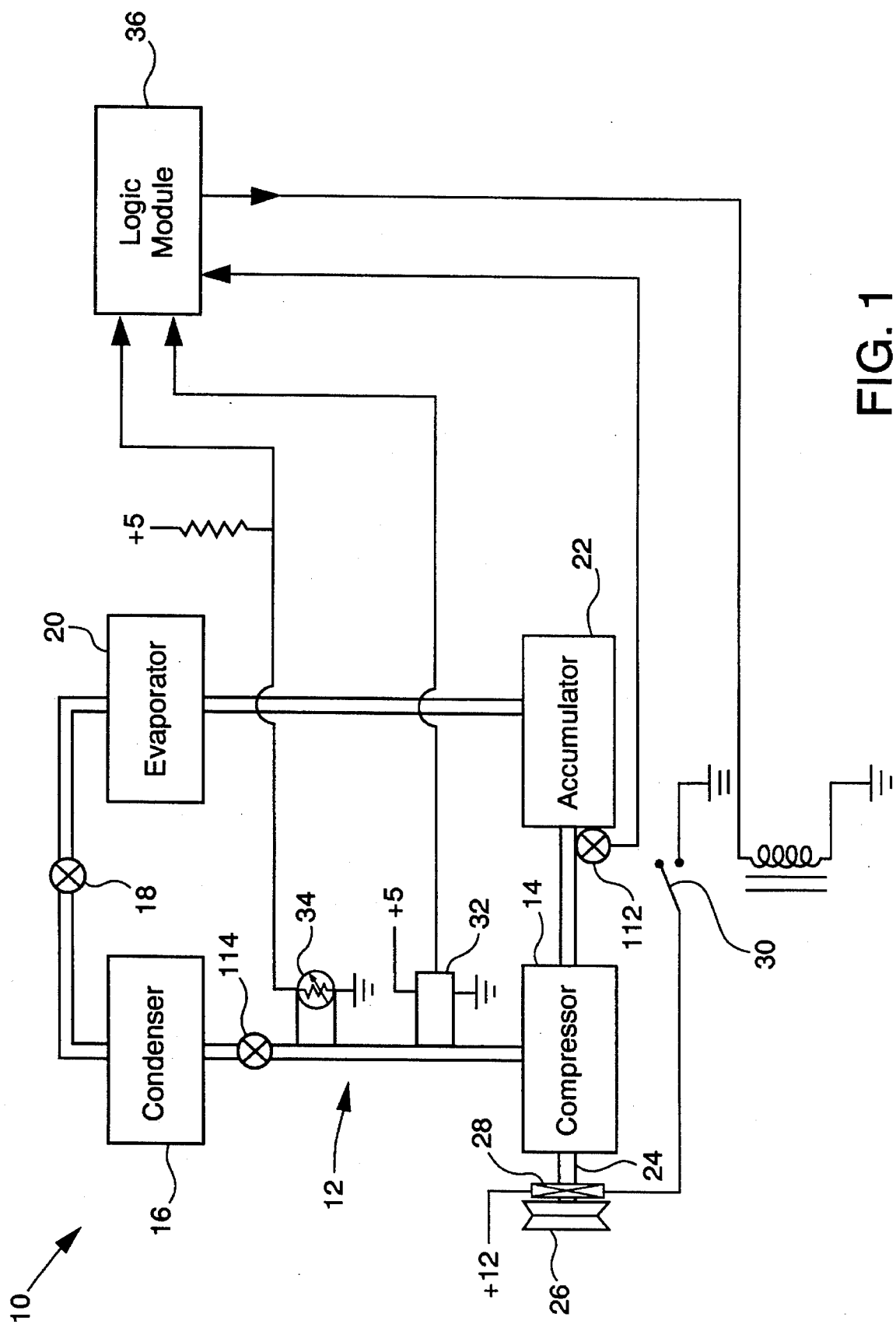
FIG. 1 is a schematic view of an apparatus according to the present invention for detecting a low level of a medium circulating through a motor vehicle refrigerant circuit.

With reference to the drawings, the preferred embodiments of the present invention will be described. FIG. 1 shows an apparatus 10 according to the present invention for detecting a low level of a medium circulating through an air conditioning system refrigerant circuit 12 of a motor vehicle. The refrigerant circuit 12 include a compressor 14, a condenser 16, an expansion orifice 18, an evaporator 20, and an accumulator 22.

The compressor 14 compresses a gaseous working medium, such as R134a refrigerant, for delivery to the condenser 16. In the condenser, the state of the refrigerant changes from gaseous to liquid. The liquid refrigerant then passes through the expansion orifice 18 to the evaporator 20, where an air blower circulates air over the evaporator to the vehicle passenger compartment. The consequent heat transfer from the ambient air to the evaporator causes the refrigerant to change to a mostly gaseous state.

The refrigerant then passes from the evaporator 20 to the accumulator 22, where the accumulator separates any remaining liquid refrigerant from the gaseous refrigerant, allowing only gaseous refrigerant to return to the compressor 14. The residual liquid refrigerant eventually also turns to a gaseous state and is then returned to the compressor. The accumulator 22 may also provide for recovery of lubricating oil contained in the refrigerant, returning a metered amount of the oil to the inlet side of the compressor.

A drive shaft 24 extending outwardly from the compressor 14 has a pulley 26 rotatably mounted thereon. The pulley is driven by the vehicle engine (not shown), and is capable of being connected to and disconnected from the drive shaft 24 by an electromagnetic clutch 28. The electromagnetic clutch in turn is in electrical communication with a power source such as the vehicle battery through a switch or a mechanical relay 30.

Situated in the refrigerant circuit 12 is a pressure transducer 32, which is capable of generating an analog electrical signal proportional to the instantaneous pressure of the refrigerant at a point in the refrigerant circuit. A solid state pressure transducer available from Texas Instruments, part number APT 2CP14-1, is acceptable for this application. A resistance thermometer or thermistor 34 is also located in the refrigerant circuit 12. The thermistor measures the temperature of the refrigerant, preferably at or near the point of the pressure transducer 32, and similarly to the pressure transducer, generates an analog signal indicative of the measured temperature. A thermistor suitable for this application is a General Electric AC Refrigerant Temperature Sensor designated part number 3AFT2A2, or the smaller thermistor designated part number 3AFT3A1. Of course, the in line thermistor and the pressure transducer can be combined into a single integral device to reduce the possibility of leaks in the refrigerant circuit.

An electronic logic module 36 is in electrical communication with the pressure transducer 32 and with the thermistor 34. In operation, the electronic logic module 36 first accepts the pressure signal from the pressure transducer, and determines the theoretical saturation temperature of the refrigerant at the measured pressure from a saturation look up reference table stored in its memory. The logic module 36 then compares the theoretical saturation temperature with the temperature measurement taken by the thermistor 34.

In a preferred embodiment shown in FIG. 1, the pressure transducer 32 and the thermistor 34 are located at the downstream or high pressure side of the compressor 14. When the vehicle air conditioning system is functioning normally, the refrigerant is normally at or near its saturation temperature when exiting the evaporator. However, the presence of superheated refrigerant in the evaporator tends to reflect an inadequate volume of refrigerant circulating through the refrigerant circuit 12, while the presence of subcooled liquid reflects a danger for slugging in the compressor. In general, the superheat temperature of the refrigerant vapor is defined as the number of degrees above its saturation temperature for a given pressure, and subcool is defined as the number of degrees below the saturation temperature.

Thus, a low refrigerant charge may be indicated if the logic module 36 determines that the superheat temperature of the refrigerant is greater than a predetermined level. For instance, a measurement at the low pressure side of the evaporator of 20 degrees Fahrenheit above the reference temperature may correspond to fifty percent of normal refrigerant volume, at which time a warning signal may be directed to the vehicle operator. A higher superheat may correspond to an even lower remaining charge, at which time the logic module 36 is adapted to interrupt circulation through the refrigerant circuit 12. To accommodate short term aberrations, such as may occur during high ambient vehicle start up, it is desirable for the logic module to accept a time series of multiple inputs from the pressure transducer and from the thermistor over a period of ninety seconds or more.

If the high superheat condition remains after these multiple excursions, then the electronic logic module 36 preferably interrupts circulation through the refrigerant circuit by opening the relay 30. This action interrupts the flow of electrical power to the compressor clutch 28, which can be reestablished at some later time if desired. The relay 30 may be either a wide open throttle relay or a pressure switch relay already existing on the vehicle, or a separate overriding cut-out relay in series with the other relays. Similarly, the module 36 may be either logic embedded in an existing engine control module or automatic temperature controller, or a physically separate module. Additionally, the module 36 is preferably adapted to provide the measured temperatures and pressures, as well as other diagnostic information, to a computer when the vehicle is subject to maintenance.

The logic module 36 is preferably a microprocessor-based system, with the low-charge detection scheme to maximize sensitivity and minimize false detection implemented in the software. During a period of time in a compressor clutch cycle, the superheat is continuously sampled and a running average calculated. If the average superheat values are above a first predetermined threshold, a software bad cycle counter is incremented. Over a period of time, the system continues to collect data during additional clutch cycles, and increment the counter when necessary. After the counter reaches a predetermined number of above-threshold clutch cycles, the compressor clutch is disengaged. If the clutch is not cycling, the data collection phase is artificially terminated after a preset period of time.

To avoid false detections and to give the system the opportunity to return to normal operation if the clutch is wrongly disengaged, the following scheme is used. If, during the end of a clutch cycle, the superheat value is below a second predetermined threshold, usually lower than the first threshold above, the bad cycle counter is decremented (but not below zero). The value of the counter thus reflects both the acceptable and unacceptable clutch cycles. If there are more unacceptable cycles, the counter value rises and the compressor is eventually disengaged. A second scheme is to reset the bad cycle counter to zero when an acceptable average superheat cycle occurs. This results in clutch disengagement only when a continuous series of unacceptable cycles occurs. In order to recover from any possible erroneous compressor shutdown, after a period of time, or alternatively during the next key-on sequence, the compressor clutch is re-engaged and data collected for a number of cycles. If the counter still accumulates bad cycles, the system is shut off again. If bad cycles do not accumulate, normal operation is resumed.

The pressure transducer 32 and the thermistor 34 may alternatively be located in the refrigerant circuit between the condenser 16 and the evaporator 20, or between the evaporator and the accumulator 22. Of course, the measured temperatures and pressures sufficient to trigger a cut-out of the compressor will change, depending on the location of the sensors in the refrigerant circuit.

Figure 2:
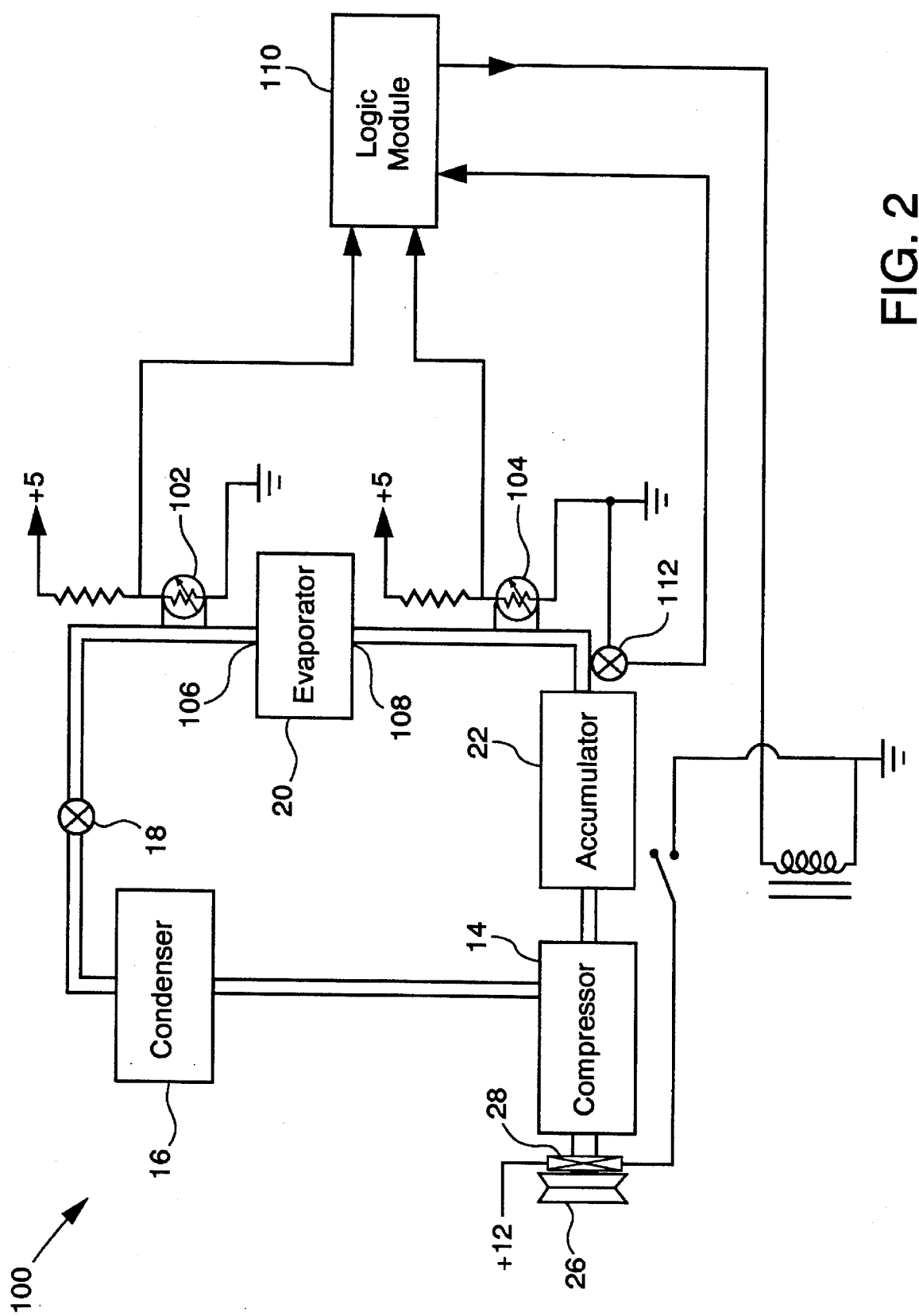
FIG. 2 is a schematic view of an alternative embodiment of the apparatus.

FIG. 2 shows an alternative embodiment 100 of the present invention which includes a pair of thermistors 102 and 104 situated in the refrigerant circuit respectively proximate an inlet 106 of the evaporator 20 and an outlet 108 of the evaporator. In normal operation, both the gaseous and liquid phases of the saturated refrigerant mixture have approximately the same temperature. At lower refrigerant charges, however, a greater percentage of the heat from the air blown over the evaporator is transferred to the vapor constituent of the refrigerant.

The apparatus 100 is therefore provided with an electronic logic module 110 in electrical communication with the thermistors 102 and 104 which accepts and compares the analog inputs therefrom. If the measured temperature difference across the evaporator 20 is greater than a predetermined value, the module 110 interrupts compressor operation, preferably by disengaging the compressor clutch 28 as described above with respect to FIG. 1. Again, it is desirable for the logic module to make several calculations over a period of time to accommodate any short term aberrations. If desired, the systems shown in FIGS. 1 and 2 can be integrated by providing a thermistor proximate the evaporator inlet to the apparatus 10 shown in FIG. 1, and controller logic capable of reacting to either strategy, or a combination of the strategies.

In another alternative embodiment of the present invention, only a switch 112 and one of the thermistors 102 or preferably 104 need be situated in the refrigerant circuit. The switch 112 preferably comprises a pressure switch situated in a clutch cycling orifice tube on or near the accumulator 22 on the low pressure side of the compressor 14. In normal operation, the clutch cycling pressure switch 112 generates an output signal to interrupt clutch engagement to turn off the compressor 14 when the refrigerant passing through the accumulator falls below a predetermined minimum pressure of about 22 psi to inhibit freezing of the evaporator. After the pressure in the system reattains a preset higher level of about 42 psi, the switch 112 re-energizes the compressor clutch 28.

The switch 112 is in communication with the logic module. At least at the moments when the switch 112 is cycled on and off, the thermistor 104 measures the temperature of the refrigerant. At these times, the pressure within the system is known from the preset switching pressures, and the corresponding temperatures at these same instants are sent to the logic module 110. The module then performs a superheat calculation by first referring to a look-up table for the saturation temperatures corresponding to the known pressures at the switch points. Then, the saturation temperatures are compared with the actual temperatures measured by thermistor 104.

If either actual temperature is higher than the theoretical saturation temperatures, a superheat condition is indicated for that instant in time. To verify accuracy, this process is preferably repeated for several excursions. If the superheat condition is confirmed to be above the value corresponding to acceptable low charge limits stored within the logic module's memory, the module determines that the system is low on charge and sends a signal to disengage the compressor clutch to prevent damage.

As an alternative to the switch 112 on the low pressure side of the compressor 14, the system may employ a dual function switch on the high pressure side of the compressor such as the dual function switch 114 shown schematically in FIG. 1. The dual function switch 114 monitors the refrigerant pressure to control the fan speed circulating air over the condenser 16, and to act as a high pressure cutout. For instance, the switch 114 may signal a controller to operate the fan at low speed at a first predetermined pressure, and to operate the fan at a higher speed at a second predetermined pressure. Additionally, the compressor clutch may be disengaged if the dual function switch 114 monitors a pressure above a certain level, for example 420 psi.

Knowing the preset pressures at which the dual function switch 114 generates its signals, temperature measurements can be taken and the logic module can perform the superheat calculation described above.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. An apparatus for detecting a low level of a medium circulating through a motor vehicle refrigerant circuit including a compressor, a condenser and an evaporator, the apparatus comprising:

a pressure transducer for generating a signal indicative of the pressure of the medium in the refrigerant circuit;

means for measuring the temperature of the medium; and an electronic logic module in communication with the pressure transducer and the means for measuring the temperature of the medium, the module accepting a plurality of inputs from the pressure transducer and the means for measuring the temperature and interrupting operation of the compressor when the medium remains at a predetermined level of superheating;

the pressure transducer and the means for measuring the temperature of the medium being located in the refrigerant circuit substantially between the compressor and the condenser.

2. The apparatus of claim 1 wherein the electronic logic module interrupts electrical power to a clutch of the compressor when the medium reaches the predetermined level of superheating.

3. The apparatus of claim 1 wherein the means for measuring the temperature of the medium comprises a thermistor.

4. The apparatus of claim 1 wherein the electronic logic module includes a look-up table having the predetermined level of superheating stored therein.

5. An apparatus for detecting a low level of a medium circulating through a motor vehicle refrigerant circuit, the apparatus comprising:

a switch situated in the refrigerant circuit and generating an output signal when a predetermined pressure is reached;

means for measuring the temperature of the medium; and an electronic logic module in electrical communication with the switch and the means for measuring the temperature of the medium, the module being adapted to interrupt circulation through the refrigerant circuit if the temperature of the medium at the predetermined pressure corresponds to a superheat condition.

6. The apparatus of claim 5 wherein the switch comprises a clutch cycling switch.

7. The apparatus of claim 6 wherein the clutch cycling switch is located on an accumulator of the refrigerant circuit.

8. The apparatus of claim 5 wherein the switch comprises a dual function switch.

9. The apparatus of claim 8 wherein the dual function switch is located on a high side of a compressor of the refrigerant circuit.

10. The apparatus of claim 5 wherein the means for measuring the temperature of the medium comprises a thermistor situated in the refrigerant circuit.

11. The apparatus of claim 17 wherein the refrigerant circuit includes a compressor, and the thermistor is situated on a low pressure side of the compressor.

* * * * *